(12) United States Patent
Mars et al.

(10) Patent No.: US 9,921,859 B2
(45) Date of Patent: Mar. 20, 2018

(54) RUNTIME COMPILER ENVIRONMENT WITH DYNAMIC CO-LOCATED CODE EXECUTION

(71) Applicant: THE REGENTS OF THE UNIVERSITY OF MICHIGAN, Ann Arbor, MI (US)

(72) Inventors: Jason Mars, Ann Arbor, MI (US); Michael Laurenzano, Dexter, MI (US); Lingjia Tang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 14/966,965

(22) Filed: Dec. 11, 2015

(65) Prior Publication Data

US 2016/0170727 A1 Jun. 16, 2016

Related U.S. Application Data

(60) Provisional application No. 62/091,297, filed on Dec. 12, 2014.

(51) Int. Cl.
*G06F 9/45* (2006.01)
*G06F 9/455* (2018.01)

(52) U.S. Cl.
CPC ........... *G06F 9/4552* (2013.01); *G06F 8/443* (2013.01)

(58) Field of Classification Search
None
See application file for complete search history.

(56) References Cited

U.S. PATENT DOCUMENTS

| | | | | |
|---|---|---|---|---|
| 6,427,234 | B1* | 7/2002 | Chambers | G06F 9/45516 717/140 |
| 7,287,166 | B1* | 10/2007 | Chang | G06F 21/54 713/176 |
| 8,578,355 | B1 | 11/2013 | Mars et al. | |
| 9,477,451 | B1* | 10/2016 | O'Farrell | G06F 8/443 |
| 2005/0005085 | A1* | 1/2005 | Miyanaga | G06F 8/445 712/32 |
| 2005/0183090 | A1* | 8/2005 | Hunt | G06F 9/443 719/310 |
| 2007/0240135 | A1* | 10/2007 | Stoodley | G06F 9/45516 717/140 |

(Continued)

OTHER PUBLICATIONS

Bala, et al. "Dynamo: a transparent dynamic optimization system," in Programming Language Design and Implementation (PLDI), 2000.

(Continued)

*Primary Examiner* — Chameli Das
(74) *Attorney, Agent, or Firm* — Marshall, Gerstein & Borun LLP

(57) ABSTRACT

A system is provided for monitoring, regenerating and replacing the code of running applications with semantically equivalent, specialized code versions that reflect the demands of the execution environment. The system includes a co-designed compiler and runtime system that virtualizes a selected set of edges in a host program, where these edges provide hooks through which the runtime system may redirect execution into an intermediate representation utilized to optimize introspective and extrospective processes.

11 Claims, 16 Drawing Sheets

(56) References Cited

U.S. PATENT DOCUMENTS

| | | | | |
|---|---|---|---|---|
| 2008/0127344 | A1* | 5/2008 | Sallam | G06F 21/52 726/23 |
| 2010/0191930 | A1* | 7/2010 | Groff | G06F 8/44 711/170 |
| 2011/0307897 | A1* | 12/2011 | Atterbury | G06F 9/4436 718/102 |
| 2013/0205281 | A1* | 8/2013 | Pizlo | G06F 8/443 717/128 |
| 2013/0205286 | A1* | 8/2013 | Barraclough | G06F 8/443 717/151 |
| 2013/0262779 | A1 | 10/2013 | Bobba et al. | |
| 2013/0282356 | A1* | 10/2013 | Chiou | G06F 17/5022 703/21 |
| 2014/0095691 | A1 | 4/2014 | Ganguli et al. | |
| 2014/0181484 | A1 | 6/2014 | Callister et al. | |

OTHER PUBLICATIONS

Bao, et al. "Defensive loop tiling for shared cache," Code Generation and Optimization (CGO), 2013.
Breech, et al. "Online impact analysis via dynamic compilation technology," in International Conference on Software Maintenance (ICSM), 2004.
Bruening, et al. "An infrastructure for adaptive dynamic optimization," in Code Generation and Optimization (CGO), 2003.
Chen, et al. "Mojo: A dynamic optimization system," in Feedback-Directed and Dynamic Optimization (FDDO), 2000.
Cheng, et al. "Tainttrace: Efficient flow tracing with dynamic binary rewriting," in IEEE Symposium on Computers and Communications (ISCC), 2006.
Chipounov, et al. "Enabling sophisticated analyses of x86 binaries with revgen," in Dependable Systems and Networks (DSN), 2011.
Cook, et al. "A hardware evaluation of cache partitioning to improve utilization and energy-efficiency while preserving responsiveness," in International Symposium on Computer Architecture (ISCA), 2013.
Delimitrou, et al. "Paragon: Qos-aware scheduling for heterogeneous datacenters," Arthitectural Support for Programming Languages and Operations Systems, 1-12 (2013).
Ebcioglu, et al. "Daisy: Dynamic compilation for 100% architectural compatibility," International Symposium on Computer Architecture (ISCA), 1997.
Feiner, et al. "Comprehensive kernel instrumentation via dynamic binary translation," in Architectural Support for Programming Languages and Operating Systems (ASPLOS), 2012.
Fu, et al. "A study of the performance potential for dynamic instruction hints selection," in Asia-Pacific Computer Systems Architecture Conference (ACSAC), 2006.
Jiang, et al. "Combining locality analysis with online proactive job co-scheduling in chip multiprocessors," High Performance Embedded Architectures and Compilers (HiPEAC) (2010).
Jimborean, et al. "Dynamic and speculative polyhedral parallelization using compiler-generated skeletons," International Journal of Parallel Programming, 2014.
Kasture, et al. "Ubik: efficient cache sharing with strict qos for latency-critical workloads," in Architectural Support for Programming Languages and Operating Systems (ASPLOS), 2014.
Knauerhase, et al. "Using os observations to improve performance in multicore systems," IEEE Micro 54-66 (2008).
Lattner, et al. "Llvm: A compilation framework for lifelong program analysis & transformation," in Code Generation and Optimization (CGO), 2004.
Laurenzano, et al., "Pebil: Efficient static binary instrumentation for linux," in Performance Analysis of Systems and Software (ISPASS), 2010.
Lin, et al. "Gaining insights into multicore cache partitioning: Bridging the gap between simulation and real systems," in High Performance Computer Architecture (HPCA), 2008.
Lu, et al. "The performance of runtime data cache prefetching in a dynamic optimization system," in International Symposium on Microarchitecture (MICRO), 2003.
Mars, et al. "Bubble-Up: Increasing Utilization in Modern Warehouse Scale Computers via Sensible Co-locations," International Symposium on MIcroarchitecture (MICRO), 12 pages (2011).
Mars, et al. "Mats: Multicore adaptive trace selection," in Workshop on Software Tools for MultiCore Systems (STMCS), 2008.
Mars, et al. "Synthesizing contention," Workshop on Binary Instrumentation and Applications 9 pages, (2009).
Mars, et al. "Whare-map: heterogeneity in homogeneous warehouse-scale computers," International Symposium on Computer Architecture (ISCA) 12 pages (2013).
Nanda, et al. "Bird: Binary interpretation using runtime disassembly," in Code Generation and Optimization (CGO), 2006.
Qureshi, et al. "Utility-based cache partitioning: A low-overhead, high-performance, runtime mechanism to partition shared caches," in International Symposium on Microarchitecture (MICRO), 2006.
Ren, et al. "Google-wide profiling: A continuous profiling infrastructure for data centers," IEEE Micro, 2010.
Rus, et al. "Automated locality optimization based on the reuse distance of string operations," Code Generation and Optimization (CGO), 2011.
Sanchez, et al. "Vantage: scalable and efficient fine-grain cache partitioning," in International Symposium on Computer Architecture (ISCA), 2011.
Sandberg, et al., "Reducing cache pollution through detection and elimination of non-temporal memory accesses," International Conference for High Performance Computing, Networking, Storage and Analysis (SC), 2010.
Scott, et al. "Retargetable and reconfigurable software dynamic translation," in Code Generation and Optimization (CGO), 2003.
Soares, et al. "Reducing the harmful effects of last-level cache polluters with an os-level, softwareonly pollute buffer," in International Symposium on Microarchitecture (MICRO), 2008.
Son, et al. "A compiler-directed data prefetching scheme for chip multiprocessors," Principles and Practice of Parallel Programming (PPoPP), 2009.
Tam, et al. "Managing shared l2 caches on multicore systems in software," in Workshop on the Interaction between Operating Systems and Computer Architecture (WIOSCA), 2007.
Tang, et al. "Compiling for niceness: Mitigating contention for qos in warehouse scale computers," Code Generation and Optimization (CGO), 2012.
Tang, et al. "Repos: Reactive static/dynamic compilation for qos in warehouse scale computers," Architectural Support for Programming Languages and Operating Systems (ASPLOS), 12 pages (2013).
Voss, et al. "High-level adaptive program optimization with adapt," in Principles and Practices of Parallel Programming (PPoPP), 2001.
Yang, et al. "Bubble-Flux: Precise Online QoS Management for Increased Utilization in Warehouse Scale Computers," International Symposium on Caomputer Architecture (ISCA) 12 pages (2013).
Zhang, et al. "An event-driven multithreaded dynamic optimization framework," in Parallel Architectures and Compilation Techniques (PACT), 2005.
Zhang, et al. "Cpi2: Cpu performance isolation for shared compute clusters," in European Conference on Computer Systems (EuroSys), 2013.
Zhang, et al. "Smite: Precise qos prediction on real system smt processors to improve utilization in warehouse scale computers," in International Symposium on Microarchitecture (MICRO), 2014.
Zhang, et al. "Towards practical page coloring-based multicore cache management," in European conference on Computer Systems (EuroSys), 2009.
Zhao, et al. "Umbra: Efficient and scalable memory shadowing," in Code Generation and Optimization (CGO), 2010.
Zhuravlev, et al. "Addressing shared resource contention in multicore processors via scheduling," Architectural Support for Programming Languages and Operating Systems (ASPLOS) (2010).

* cited by examiner

```
prefetchnta (%r14)              // m1
mov       %r13,%rsi
shl       $0x4,%rsi
mov       (%r14),%r8
prefetchnta (%r8,%rsi,1)        // m2
mov       (%r8,%rsi,1),%rax
```

(a) $\langle m_1, m_2 \rangle = \langle 1, 1 \rangle$

*FIG. 2A*

```
prefetchnta (%r14)              // m1
mov       %r13,%rsi
shl       $0x4,%rsi
mov       (%r14),%r8
mov       (%r8,%rsi,1),%rax     // m2
```

(b) $\langle m_1, m_2 \rangle = \langle 1, 0 \rangle$

*FIG. 2B*

```
mov     %r13,%rsi                   // m1
shl     $0x4,%rsi
mov     (%r14),%r8
prefetchnta (%r8,%rsi,1)            // m2
mov     (%r8,%rsi,1),%rax
```

(c) $\langle m_1, m_2 \rangle = \langle 0, 1 \rangle$

FIG. 2C

```
mov     %r13,%rsi                   // m1
shl     $0x4,%rsi
mov     (%r14),%r8
mov     (%r8,%rsi,1),%rax           // m2
```

(d) $\langle m_1, m_2 \rangle = \langle 0, 0 \rangle$

FIG. 2D

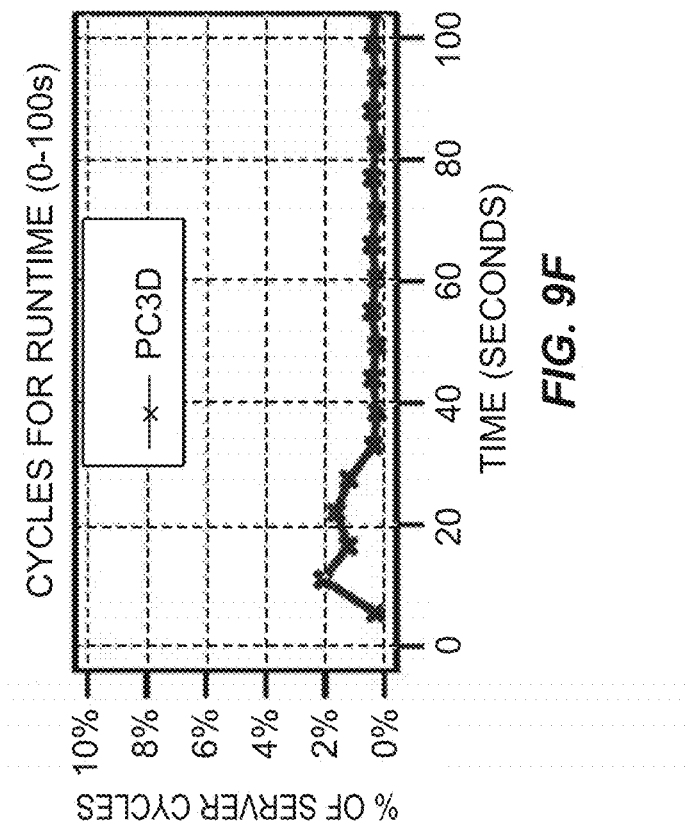
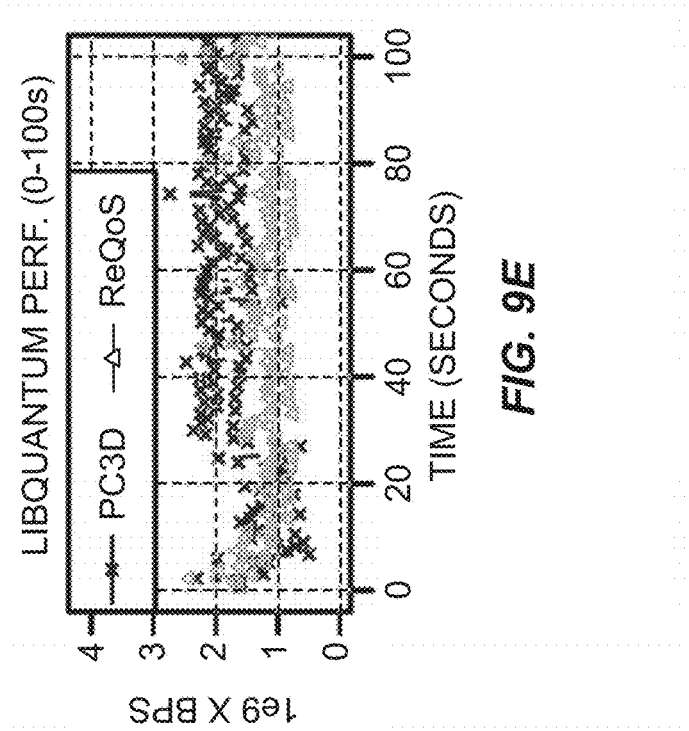
FIG. 9F
FIG. 9E

Algorithm 1: Greedy search for a code variant $\overline{best}$ that uses the right mix of cache contention reduction and napping to maximize application performance output: $\overline{best}$
/* enact/evaluate $\overline{0}$ to obtain the nap intensity ($nap_{\overline{0}}$) applied to the variant to meet co-runner QoS and the performance ($R_{\overline{0}}$) of the variant at that nap intensity */
$(nap_{\overline{0}}, R_{\overline{0}}) \leftarrow VariantEval(\overline{0}, 0, 1)$
$(nap_{\overline{1}}, R_{\overline{1}}) \leftarrow VariantEval(\overline{1}, 0, 1)$
$nap_{UB} \leftarrow nap_{\overline{0}}, nap_{LB} \leftarrow nap_{\overline{1}}$
$\overline{m} \leftarrow \overline{1}, \overline{best} \leftarrow \overline{1}, R_{\overline{best}} \leftarrow R_{\overline{1}}$
$i \leftarrow 1$
while $i \leq n$ and $nap_{LB} < nap_{UB}$ do
    $\overline{m} \leftarrow (m_1, ..., !m_i, ..., m_n)$ // flip $i$th bit in $\overline{m}$
    $(nap_{\overline{m}}, R_{\overline{m}}) \leftarrow VariantEval(\overline{m}, nap_{LB}, nap_{UB})$
    if $R_{\overline{best}} < R_{\overline{m}}$ then
        $R_{\overline{best}} \leftarrow R_{\overline{m}}, \overline{best} \leftarrow \overline{m}, nap_{UB} \leftarrow nap_{\overline{m}}$
    else
        $\overline{m} \leftarrow (m_1, ..., !m_i, ..., m_n)$ // reject change
    end
    $i++$
end
return $\overline{best}$

*FIG. 11*

Algorithm 2: *VariantEval*, evaluation of a single program variant in PC3D input : $\overline{m}$, $nap_{LB}$, $nap_{UB}$
output: $nap_{\overline{m}}$, $BPS_{\overline{m}}$
$nap_{cur} \leftarrow (nap_{LB} + nap_{UB})/2$
$BPS \leftarrow 0$
generate and dispatch variant $\overline{m}$
while $nap_{LB} < nap_{UB}$ do
    set_nap_intensity ($nap_{cur}$)
    if *QoS of co-runners is satisfied* then
        $nap_{UB} \leftarrow nap_{cur}$
        $BPS \leftarrow \text{BranchesPerSecond}_{\overline{m}}$
    else
        $nap_{LB} \leftarrow nap_{cur}$
    end
    $nap_{cur} \leftarrow (nap_{LB} + nap_{UB})/2$
end
return ($nap_{cur}$, $BPS$)

*FIG. 12*

RUNTIME COMPILER ENVIRONMENT WITH DYNAMIC CO-LOCATED CODE EXECUTION

CROSS-REFERENCE TO RELATED APPLICATION

This application claims the benefit of U.S. application Ser. No. 62/091,297, filed Dec. 12, 2014, entitled "Runtime Compiler Environment with Dynamic Co-Located Code Execution," which is hereby incorporated by reference in its entirety.

STATEMENT OF GOVERNMENTAL INTEREST

This invention was made with government support under CCF1302682 and CNS 1419243 awarded by the National Science Foundation. The Government has certain rights in the invention.

FIELD OF THE INVENTION

The present disclosure relates to compilers and program code execution and, more particularly, to techniques for optimizing program code execution by the use of dynamic, compiled co-located code.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Large enterprises such as Google and Facebook build and maintain large datacenters known as Warehouse Scale Computers (WSCs) dedicated to hosting popular user-facing web services. These datacenters are expensive and resource-intensive. The scale is so large that these datacenters now require dedicated power plants for energy.

Maximizing the efficiency of computer resources in modern WSCs is a challenge rooted in finding ways to consistently maximize server utilization to minimize cost. One strategy for maximizing server utilization has been to co-locate multiple applications on a single server. However, a significant challenge that emerges from the unpredictable dynamism in WSCs is the threat that such solutions will violate quality of service (QoS) needs for user-facing applications, which are known to be latency sensitive. Sources of this dynamism include (1) fluctuating user demand (load) for user-facing applications, (2) highly variable co-locations between user-facing and batch applications on a given machine, and (3) constant turnaround on each server; when an application completes, new applications are mapped to the server.

Despite this dynamism, a capability missing in the WSC system software stack is the ability to dynamically transform and re-transform executing application code. That void limits the design space when designing solutions to deal with the dynamism found in WSCs and leads to missed optimization opportunities. An example of such a missed optimization is the ability to apply software non-temporal memory access hints to an application code to reduce its cache allocation and protect the QoS of its user-facing latency-sensitive co-runners. Modern ISAs, such as x86 and ARMv8, include prefetch instructions that hint to the processor that a subsequent memory access should not be cached. This instruction provides a mechanism that may cause an application to occupy more or less shared cache, and thus can enable higher throughput co-locations while protecting the QoS of high priority co-runners. However, it is difficult to leverage these hints effectively without a mechanism to dynamically add and remove them in response to changing conditions on the server.

'Napping' mechanisms, used reduce pressure on shared resources, have also motivated the need for a mechanism to dynamically add and remove instructions. ReQoS, for example, is a static compiler-enabled dynamic approach that throttles low-priority applications to allow them to be safely co-located with high-priority co-runners, guaranteeing the QoS of the high-priority co-runners and improving server utilization. However, due to the inability to transform application code online, these approaches are limited to using the heavy handed approach of putting the batch application to sleep, i.e., napping, to reduce pressure on shared resources.

In short, while the advantages of a mechanism for online code transformation are apparent, designing such a mechanism that is deployable in production environments has proved challenging. This has sorely limited adoption of dynamic compilation, particularly in production and commercial domains. Several challenges have prevented the realization of deployable dynamic compilation:

Overhead—It has been reported that companies such as Google tolerate no more than 1% to 2% degradation in performance to support dynamic monitoring approaches in production. The high overhead that is common in traditional dynamic compilation frameworks has served as a barrier to adoption in these performance-critical datacenter environments.

Generality and Low Complexity—To avoid hardware lockin and overly complex software maintenance, a deployable dynamic compilation system should impose little or no burden on application developers and should require no specialized hardware support.

Transformation Power—Traditional dynamic optimizers raise native machine code to an intermediate representation before applying transformations. This approach limits the power of the transformations due to loss of source level information. Having the ability to apply transformations online that are as powerful as static compilation significantly impacts the flexibility of the dynamic compiler.

Continuous Extropsection—In a highly dynamic environment where multiple applications co-run, specializing code to runtime conditions should be done both introspectively, based on a host program's behavior, and extrospectively, based on external applications that are co-located on the same machine. To accomplish this, a runtime code transformation system must be aware of changing conditions for both itself and its neighbors, applying or undoing transformations accordingly.

SUMMARY

The present application describes a general-purpose, near-free approach to monitoring, regenerating and replacing the code of running applications with semantically equivalent, specialized code versions that reflect the demands of the execution environment. For convenience purposes, we refer to the techniques herein collectively and individually as "protean" code or "protean" applications. "Protean" refers to a co-designed compiler and runtime system built that may be on top of a low-level virtual machine (LLVM).

In an example implementation, at compile time, a host program (also termed herein a "main" program) is prepared by a compiler pass that virtualizes a selected set of edges in the control flow and call graphs of the host program. These edges provide hooks through which the runtime system may redirect execution. This mechanism allows the runtime system, including the dynamic compiler, to operate asynchronously while the application continuously runs. The compiler may embed a copy of the program's intermediate representation (IR) into the data region, to be utilized by the runtime compiler for rapidly performing rich analysis and transformations on the program. The protean code runtime may monitor some or all running programs on the system, generating and dispatching specialized program variants that are tailored to the particular conditions detected on the system at any given point in time. In this way, the techniques herein are able to monitor runtime conditions on the host machine ("host conditions"), introspective and extrospective processes, as well as runtime processes across connected machines ("external conditions," i.e., other extrospective processes), and then dynamically switch instructions between the program and specialized variants of the program. In some instances, those specialized variants can be a complete co-located version of the program, a co-located version of portions of the program code, other program code configured to handle execution of code compatible with that of the program code, and other implementations.

The techniques herein are able to address the aforementioned challenges in a number of ways:

Low Overhead—Diverting program control flow through selectively virtualized points introduces near-zero (<1%) overhead and provides a seamless mechanism through which the runtime compiler introduces new code variants as they become ready.

General and Flexible—To enact optimizations, in some examples, the protean code requires no support from the programmer (of the main program) or any specialized hardware.

Transformation Power—Protean code can embed the IR into the main program at compile time, which in turn is used by the runtime compiler as the starting point for analysis and optimization. Using the IR gives the runtime compiler the flexibility of a static compiler in terms of the analysis and optimization options that are available.

Continuous Extrospectio—The protean code runtime uses program counter samples along with inter- and intra-core hardware performance monitors to detect changes to both host applications and external applications co-located on a single machine. This approach allows the runtime to react to highly dynamic environments by revisiting compilation choices introspectively as program phases change or extrospectively as the environment changes.

In accordance with an example, a computer-implemented method of compiling a host application code for runtime execution on one or more runtime processors, the method comprises: receiving a host application code; virtualizing, in one or more processors, one or more control edges in the host application code, the host application code comprising a plurality of executable functions and/or code regions, where the one or more control edges are redirection points for a subset of the plurality of functions and/or code regions, the redirection points being configured for redirecting a runtime complier out of the host application code during the runtime execution and into a co-located function and/or code regions for execution in place of the corresponding function of the subset of the plurality of functions and/or code regions; embedding, in the one or more processors, metadata into the host application code, wherein the metadata includes at least one of (i) a mapping of the subset of the plurality of functions and/or code regions to the one or more control edges or (ii) an intermediate representation of the host program that encodes source level information and program analysis information; and forming, in the one or more processors, a runtime version of the host application code to include the plurality of executable functions and/or code regions and the metadata.

In some examples, the intermediate representation is embedded into the host application code at the binary level.

In some examples, metadata structures includes an edge virtualization table that maps the subset of the plurality of functions and/or code regions to the one or more control edges, wherein the edge virtualization table comprises source and target addresses for each of the one or more virtualized control edges.

In some examples, the method further includes virtualizing the one or more control edges by establishing control edges at code branches and/or code calls within the host application code.

In some examples, the method further includes virtualizing the one or more control edges by establishing control edges at functional calls within the host application code.

In some examples, the method further includes virtualizing the one or more control edges by establishing control edges at functional calls where the callee function has more than one basic block.

In accordance with another example, a system comprises: one or more processors and one or more memories, the one or more memories storing instructions that when executed by the one or more processors, cause the one or more processors to: receive a host application code; virtualize, in one or more processors, one or more control edges in the host application code, the host application code comprising a plurality of executable functions and/or code regions, where the one or more control edges are redirection points for a subset of the plurality of functions and/or code regions, the redirection points being configured for redirecting a runtime complier out of the host application code during the runtime execution and into a co-located function and/or code regions for execution in place of the corresponding function of the subset of the plurality of functions and/or code regions; embed, in the one or more processors, metadata into the host application code, wherein the metadata includes at least one of (i) a mapping of the subset of the plurality of functions and/or code regions to the one or more control edges or (ii) an intermediate representation of the host program that encodes source level information and program analysis information; and form, in the one or more processors, a runtime version of the host application code to include the plurality of executable functions and/or code regions and the metadata.

In accordance with an example, a computer-implemented method of executing a host application code using one or more runtime processors and using co-located code instructions accessible to the one or more runtime processors, the method comprising: monitoring the host application code during runtime, the host application code including a plurality of functions and/or code regions; identifying one or more control edges within the host application code, where the one or more edges are redirection points for a subset of the plurality of functions and/or code regions; caching a code variant for each function and/or code region associated with the one or more control edges; and during runtime execution of the host application code, redirecting code execution out of host application code at each of the one or more control edges to execute the cached code variant corresponding to the function and/or code region associated with the one or more edges and redirecting code execution back into the host application code after completion of the executed cached code variant.

In some examples, the method includes performing an introspective monitoring of the host application code and performing an extrospective monitoring for changes in a runtime environment.

In some examples, extrospective monitoring includes monitoring for changes in the input/load fluctuation, changes in the starting or stopping of co-running applications, phase changes in the host application code, and/or phase changes in a runtime execution environment.

In some examples, the phase changes in the host application code comprise changes in the instructions per cycle or branches retired per cycle.

In some examples, phase changes in hardware performance comprise cache misses, bandwidth usage, queries per second, and/or latency.

In some examples, redirecting code execution occurs in response to a triggered determined from the introspective monitoring and/or the extrospective monitoring.

In some examples, the method includes: identifying, through the monitoring of the host application during runtime, that one or more performance slowdown conditions are present during runtime; and determining (i) when to identify the one or more control edges within the application code, (ii) the number of the one or more control edges to be identify, and (iii) the number of code variants to cache so that the one or more performance slowdown conditions are reversed as a result of the redirecting code execution out of host application code.

In some examples, the method includes caching the code variant for each function and/or code region associated with the one or more control edges in a low-level virtual machine state.

In some examples, the method includes caching the code variant for each function and/or code region associated with the one or more control edges buy updating a metadata table in the host application code, the metadata table mapping of subset of the plurality of functions and/or code regions to the one or more control edges.

In accordance with yet another example, a system comprises: one or more processors and one or more memories, the one or more memories storing instructions that when executed by the one or more processors, cause the one or more processors to: monitor the host application code during runtime, the host application code including a plurality of functions and/or code regions; identify one or more control edges within the host application code, where the one or more edges are redirection points for a subset of the plurality of functions and/or code regions; cache a code variant for each function and/or code region associated with the one or more control edges; and during runtime execution of the host application code, redirect code execution out of host application code at each of the one or more control edges to execute the cached code variant corresponding to the function and/or code region associated with the one or more edges and redirecting code execution back into the host application code after completion of the executed cached code variant.

BRIEF DESCRIPTION OF THE DRAWINGS

FIGS. 2A-2D illustrate sets of variants for a small code region within a host program.

FIG. 9A-9F are plots indicating the dynamic behavior of a host program ("libquantum") running with web-search application employing the compiler and runtime techniques of FIGS. 1A and 1B versus a conventional "napping" optimization technique, in accordance with an example comparison.

FIG. 11 illustrates an algorithm that may be used to perform a variant code search within a host program for establishing co-located code, in accordance with an example.

FIG. 12 illustrates an algorithm that may be used to evaluation the variant code identified using the algorithm of FIG. 11, in accordance with an example.

DETAILED DESCRIPTION

Techniques are described that provide a dynamic compilation system. The techniques include compiling environments and runtime environments. The techniques are able to virtualize control edges within a host application code that contains a plurality of executable functions and/or code regions. The control edges may serve as redirection points for a subset of those functions and/or code regions, such that a runtime environment is able to switch control out of the host application code, through analysis of metadata inserted into the host application code, and execute those functions and/or code regions using co-located code cached in the runtime environment.

Figure 1A:
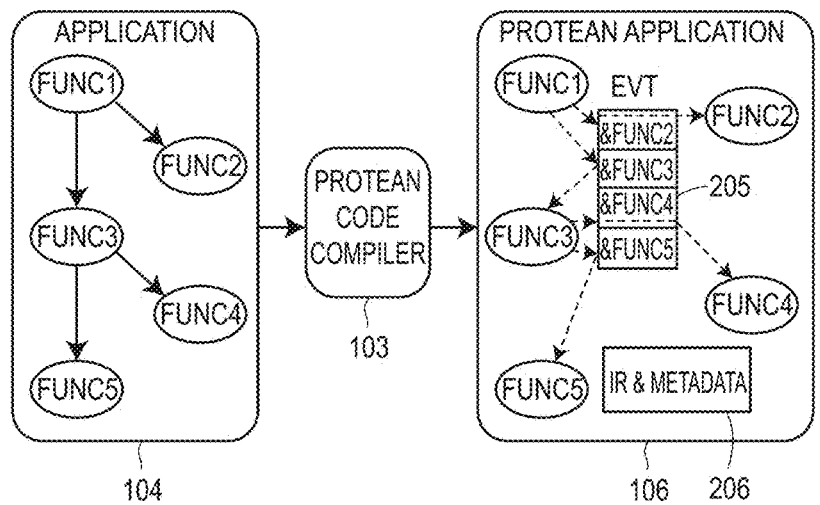
FIGS. 1A and 1B are schematic overviews of the protean code compiler environment and runtime environment, respectively, affecting a host program.
Figure 1B:
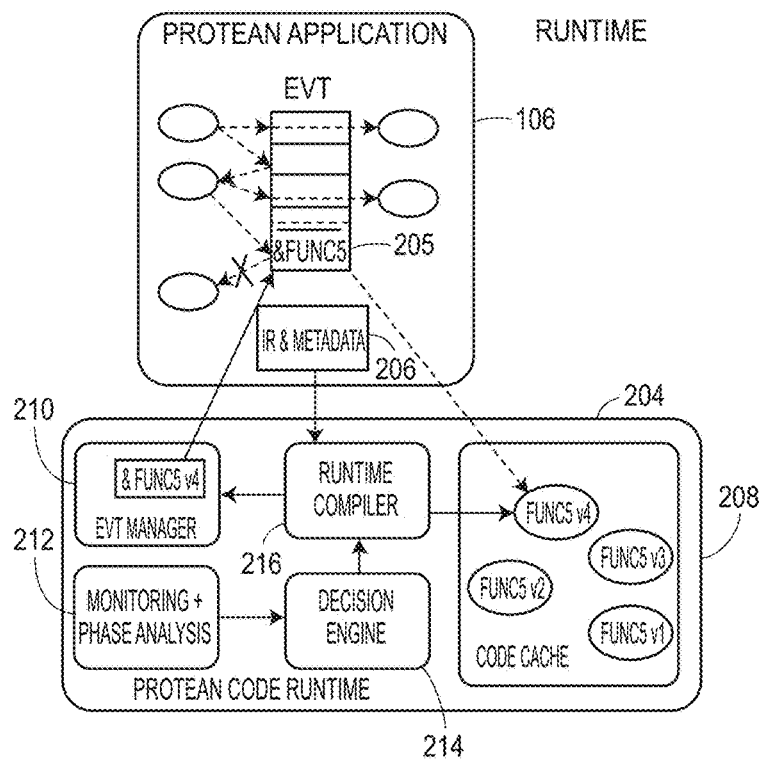

FIG. 1A is schematic illustration of a compiler environment 102 of the present techniques in an example. FIG. 1B is a schematic illustration of a runtime environment 202 of the present techniques in an example. Together FIGS. 1A and 1B illustrate overall example schematic implementations of the techniques described herein, also termed ("protean"). The compiler environment 102 includes a protean code compiler module 103 that manages compiling of a host application ("main application") 104. The runtime environment includes a code runtime module 204 that manages runtime execution and optimization of code execution of a compiled "protean" application 106 built from the host application 104, as further discussed below.

Both environments 102 and 202 may execute on a host machine that includes one or more processors and one or more memories. An example is provided below in FIG. 10, as computer system 340. In some examples, the environments 102 and 202 execute on one or more processors (and memories) that exist on different machines, for example, different computing devices or servers connected to one another over a wired or wireless connection link. In such some configurations, for example, the environments 102 and 202 execute primarily on a host machine but also access external machines coupled to that host. For example, the modules 103 and 204 may execute on a host machine but may access performance data from external processing machines as a part of the compiler and/or runtime process.

The compiler module 103 executes on a host machine and accesses (or is accessed) by the host ("main") program 104. In the illustrated example, the host program 104 includes a plurality of functions (func1-1func5), some of which are independent functions while others are triggered by other functions or states. In the illustrated example, during a compiling state of the host machine, the functions from the application 104 are communicated to (or accessed by) the compiler module 103, which then creates the runtime protean application 106 from the functions. To affect this process, in some examples, the compiler module 103 accesses the program 104 for runtime compilation and makes class changes to the functions in the program.

In the illustrated example, the compiler module 103 makes two classes of changes to the program 104. First, the module 103 virtualizes a subset of the edges in the program's control flow and call graphs. These virtualized edges then serve as points in the program control flow at which the runtime environment 202 may redirect execution. Second, the compiler 103 embeds several metadata structures, including an Edge Virtualization Table (EVT) 205 and intermediate representation 206 of the program 104, within the program's data region in the protean application 106. These metadata structures are used to aid the runtime system 202 in dynamically introducing new code variants into the protean program 106 during runtime.

The compiler module 103 may operate to compile the entire program 104 to create an entire protean application version 106 of the program 104. In other examples however, the compiler module 103 may operate to create different executable modules of portions of the program code.

In the runtime environment 202, the runtime module 204 monitors execution of the host program 106 as well as its external execution environment, i.e., introspectively and extrospectively, in order to dynamically generate and dispatch code variants when needed. Code variants refers to code created by the compiler module 103 from the main program 104 and that will execute in place of code (e.g., executable functions and/or code regions) in the main program 104 to provide for more efficient execution.

During runtime, the runtime module 204 first initializes execution by attaching to the protean program 106 created by the compiler module 103. For example, the runtime module 204 creates the protean code runtime environment 202 that is created from identifying program metadata 206 in the protean application 106, and setting up a shared code cache 208 from which the program 106 can execute new code variants.

To generate and dispatch a code variant, the runtime compiler 204, operating as a low-level virtual machine (LLVM)-based compiler backend, leverages the intermediate representation (IR) 206. The new code variant is then inserted into the code cache 208 and dispatched into the running host program by an EVT manager 210.

During execution of the main program 106, a lightweight monitoring component 212 of the runtime module 204 detects changes in both the main program phases and in the external environment, whether in the host computing machine and/or in connected computing machines. The monitoring component 212 may monitor co-running applications, for example, using samples of program counters and hardware performance monitors. The phase and external environment data from the monitoring component 212 is communicated to a decision engine 214 that determines when and how to generate new code variants and selects the appropriate variant for the current execution phase.

In some examples, the techniques herein are implemented with three principles in mind. First, whereas maintaining absolute control of a host program throughout execution (as in traditional dynamic compilers such as DynamoRIO) leads to high overhead, the protean runtime module 204 instead allows the original binary code to continuously execute and diverts program control flow at a set of virtualized points, introducing negligible overhead. A runtime compiler 216 of the module 204 may be invoked asynchronously at a controllable granularity, which also limits the overhead. Second, many traditional dynamic compilers hoist the native machine code into an intermediate format at runtime to perform analysis and transformation, leading to overhead and the loss of rich semantic information present in IR from the static compiler, whereas the protean application 106 is embedded with the IR into the program binaries, allowing the compiler module 204 to perform powerful analysis and transformations online with little overhead. Third, the protean application 106 may require no support from the programmer or any specialized hardware, allowing it to be seamlessly deployed for large applications on commodity hardware.

A useful property of the application binaries produced by compiler module 103 is that they can be run without the runtime system, incurring negligible extra runtime overhead. In addition, once compiled with the compiler module 103, any protean code runtime can be used. These are particularly useful features in a datacenter environment, where rapidly changing conditions may dictate applying different classes of optimizations in the pursuit of different objectives to the same application binary.

Example Protean Code Compiler Module

In operation, the protean code compiler module 103 readies the host program 104 for runtime compilation by (1) virtualizing control flow edges and (2) embedding metadata in the program binary.

To control flow edge virtualization, the compiler module 103 may add a compiler pass to convert a subset of the branches and calls in the program from direct to indirect operations. By virtualizing a subset of edges, the compiler module 103 may set up those edges as points in the programs execution where its control flow path may be easily altered by the protean code runtime to route program execution to an alternate variant of the code.

A number of considerations may be used when selecting which edges to virtualize. Selecting too many edges or edges that are executed too frequently may result in unwanted overheads because indirect branches are generally slightly slower than direct branches. On the other hand, selecting only edges that are rarely executed risks introducing large gaps in execution during which new code variants are not executed.

Numerous approaches may be used when choosing how to virtualize edges. In an example, the compiler module 103 is confined to select edges to virtualize only function calls, and only those function calls where the callee function has more than one basic block.

The compiler module 103 also embeds the metadata 206 in the program 106. In an example, the runtime environment 202 may use two types of program metadata to rapidly generate and dispatch correct, alternate code variants at runtime. As illustrated, one type of metadata is the EVT 205, which is a data structure that contains the source and target addresses of the edges virtualized by compiler module 103. The EVT 205 is the central mechanism by which execution of the program is redirected by the runtime environment 202. To change execution, the runtime module 204 may rewrite target addresses in the EVT 205 to point to the new code variant.

The other type of metadata, as illustrated, is the intermediate representation (IR) 206. The compiler module 103 compresses and places the intermediate representation of the program 104 into the data region 206, which the runtime module 204 decompresses then deserializes, leveraging it to perform analysis and transformations. Having direct access to the IR yields two significant advantages. First, it allows the runtime module 204 to avoid disassembling the binary, which can be difficult without access to fine-grain information about the executing code paths. Second, the alternative of hoisting the binary to IR, as is done in prior work, loses important semantic information and limits the flexibility of the compiler.

Example Protean Code Runtime Module

The protean code runtime module 204 may include a set of mechanisms that work together to generate and dispatch code variants as the host program executes.

Runtime Initialization: operating on the executable program 106 prepared by compiler module 103, the runtime process begins by the module 204 attaching to the program 106. The runtime module 204 first discovers the location of the structures inserted by compiler module 103 at compile time, including the EVT 205 and the IR 206. The runtime module 204 initializes the code cache 208, used to store the code variants generated by the dynamic compiler. Because the EVT 205 and code cache 208 are structures that are shared between the program 106 and the runtime module 204 and may be frequently accessed, the runtime module 204 may set up a shared memory region via an anonymous map to encompass both structures.

Code Generation and Dispatch: The runtime module 204 generates and dispatches code variants into the program 106 asynchronously. When a new variant of a code region is requested, the dynamic compiler 216 leverages the IR of the code region to generate the new variant. Once a new code variant has been generated, it is placed into the code cache 208. The EVT manager 210 then modifies the EVT 205 so that the target of the corresponding virtualized edge is the head of the newly minted variant in the code cache. The EVT update may be a single atomic memory write operation on most modern platforms, and thus requires no synchronization between the host program and the runtime to work correctly.

Throughout these actions of the runtime environment 202, execution of the program 106 proceeds as normal until control flows through the virtualized edge, at which point control reaches the new code variant.

Monitoring, Phase Analysis and Decisions: The runtime module 204 may support both introspection, monitoring changes in the host program, and extrospection, monitoring changes in the execution environment. Based on this monitoring, the runtime module 204 makes decisions and adapts to changing system conditions such as application input/load fluctuation, starting or stopping of co-running applications, and phase changes among both the host programs and external programs.

In terms of introspection, for main programs, the runtime module 204 identifies hot code regions by sampling the program counter periodically through the ptrace interface. The runtime module 204 then associates the program counter samples with high-level code structures such as functions, allowing the runtime module 204 to keep track of which code regions are currently hot, as well as how hot regions change over time.

To identify phase changes, in some examples, the runtime module 204 may leverage hardware performance monitors to track the progress of the program, using the monitoring component 212. Phases are defined in terms of the hot code identified by program counter samples described above as well as by the progress rate of the running applications using metrics such as instructions per cycle (IPC) or branches retired per cycle (BPC). Since hardware performance monitors are ubiquitous on modern platforms and can be sampled with negligible overhead, this approach allows the runtime to conduct phase identification in a manner that is both lightweight and general across hardware platforms.

In terms of extrospection, for other external programs, the runtime module 204 may likewise track program progress and identify phase changes via hardware performance monitors. Microarchitectural status and performance, using metrics such as cache misses or bandwidth usage, may also be tracked through the performance monitor 212. Additionally, the runtime module 204 can be configured to use application-level metrics reported through application-specific reporting interfaces, such as queries per second or 99th percentile tail query latency for a web search application.

In operation, the decision engine 214 may determine (1) when to invoke the dynamic compiler 216, (2) what transformations to apply, and (3) which variant to dispatch into the running program 106. The configuration and operation of the decision engine 214 will depend on the optimization technique protean code employs. The decision engine 214 may also be designed to control how often compilation occurs to limit any overhead introduced by running the dynamic compiler.

Example Implementation for Datacenters

The techniques herein were implemented in a datacenter application that included cache management (referred to as a "datacenter cache manager," "Protean Code for Cache Contention in Datacenters," or "PC3D"). The datacenter cache manager included elements like those of the compiler module 103 and the runtime module 204, in a datacenter architecture. The datacenter cache manager produced a runtime environment that dynamically applied compiler transformations to insert non-temporal memory access hints, tuning the pressure a host application exerts on shared caches when the QoS of an external application is threatened. Datacenter cache manager was implemented entirely as a runtime system, such as described above in reference to FIGS. 1A and 1B.

The datacenter cache manager found and dispatched variants of the host program code that would contain a mix of non-temporal cache hints that would allow the host co-running application(s) to meet their QoS targets while maximizing the throughput of the host.

Datacenter cache manager searched through a spectrum of program variants of varying levels of cache contentiousness. The effectiveness of interference reduction of each variant was empirically quantified online by a protean code runtime module like the module 204. The best-performing program variant was then dispatched and run until a new program phase or external application sensitivity phase was detected. In cases where relying solely on non-temporal cache hints was unable to ensure QoS of the external applications, naps were mixed with cache pressure reduction as a fallback.

Code Variant Search Space

The datacenter cache manager generated and dispatched program variants that contain a selection of non-temporal cache hints. We referred to each such program variant as a bit vector $\overline{M} = \langle M_1, M_2, M_N \rangle$, where N is the number of loads in the host program's code and $M_i \in \{0, 1\}$ represents the absence or presence of a non-temporal cache hint associated with the ith load. The set of program variants of this form is the set of all possible bit vectors of length N, which has a cardinality of $2^N$. FIGS. 2A-2D show the four variants for a small code region (N=2) within "libquantum," where each of the four variants contains a different mix of non-temporal cache hints. libquantum is a C library program used for the simulation of quantum mechanics and quantum computing, that served as the host (or main) program. The datacenter cache manager searched the variants using a greedy search algorithm whose complexity was O(N). However, even with a search complexity that is linear in the number of load instructions, the number of variants may still be large. To navigate this space efficiently, datacenter cache manager employed several heuristics, as listed below.

Exclude Uncovered Code—Leveraging the program code (PC) samples collected for host program phase analysis, we expected code regions that never appear in those samples to have a minimal impact on cache pressure and application performance. Therefore, the loads from regions not appearing in the PC samples were pruned from the search space prior to the search. This reduced the number of loads that must be considered by an average of 12×.

Prioritize Hotter Code—Furthermore, we expected code regions appearing more frequently in the PC samples to have a higher impact. Therefore the datacenter cache manager example prioritized loads from hotter code regions in the search.

Only Innermost Loops—For a range of contentious applications, we have observed that an average of more than 80% of the dynamic loads come from the maximum-depth loop(s) within each of the program functions. Leveraging the host program's IR, the datacenter cache manager recognized loops and their nesting depths, then pruned from the search space loads that are not at the maximum depth.

The number of static loads remaining after applying these heuristics was on average a factor of 44× smaller than the total number of static loads in the program.

After the datacenter cache manager applied these heuristics, the manager search was limited to variants that are of the form $\overline{m} = \langle m_1, m_2, \ldots m_n \rangle$, where $m_i \in \{0, 1\}$. $\overline{m}$ is a bit vector of the n loads from innermost loops among active code regions in the program phase, ordered roughly by how much impact they are expected to have on execution. For convenience, we refer to the variant where every load lacks a non-temporal hint as $\overline{m} = \overline{0}$ and its converse, the variant where every load has a non-temporal hint, as $\overline{m} = \overline{1}$.

Traversing the Variant Search Space

The variant search was guided by Algorithm 1 (FIG. 11), which along with Algorithm 2 (FIG. 12), represents instructions executed by a runtime module. The search began by evaluating variants $\overline{0}$ and $\overline{1}$, which are the variants that exert the most and least amount of cache pressure, respectively, out of all the variants in the search space. Because these variants are at the extremes of cache pressure, they are also at the extremes of the nap intensity required to meet co-runner QoS targets, and therefore may be viewed as lower and upper bounds, respectively, for the nap intensity that would theoretically be required to satisfy co-runner QoS for any program variant.

Using $\overline{1}$ as a starting point, the algorithm steps through loads in the order of decreasing importance. For each load, the algorithm revokes the load's non-temporal hint, then calls VariantEval (Algorithm 2) to enact the resulting code variant and evaluate whether that revocation improves the application's performance given the particular level of cache pressure produced by that variant along with the level of nap intensity required to allow the application's co-runners to meet their QoS targets. If the incremental change is found to have improved application performance, the change is kept and the algorithm repeats these steps on the next load. Otherwise, the change is rejected and the algorithm repeats these steps on the next load.

Online Evaluation of Variants

The datacenter cache manager searched for program variants that improved application performance while meeting co-runner QoS. Guiding the search were empirical evaluations of a sequence of program variants, which are dispatched then evaluated against the current running set of co-runners. Each variant produces a particular level of cache contentiousness, and may need to run with a particular nap intensity to allow its co-runners to hit their QoS targets. In this way, the datacenter cache manager (and the techniques herein more broadly) may choose an optimum or more optimum variant from among a plurality of possible variants.

Figure 3A:
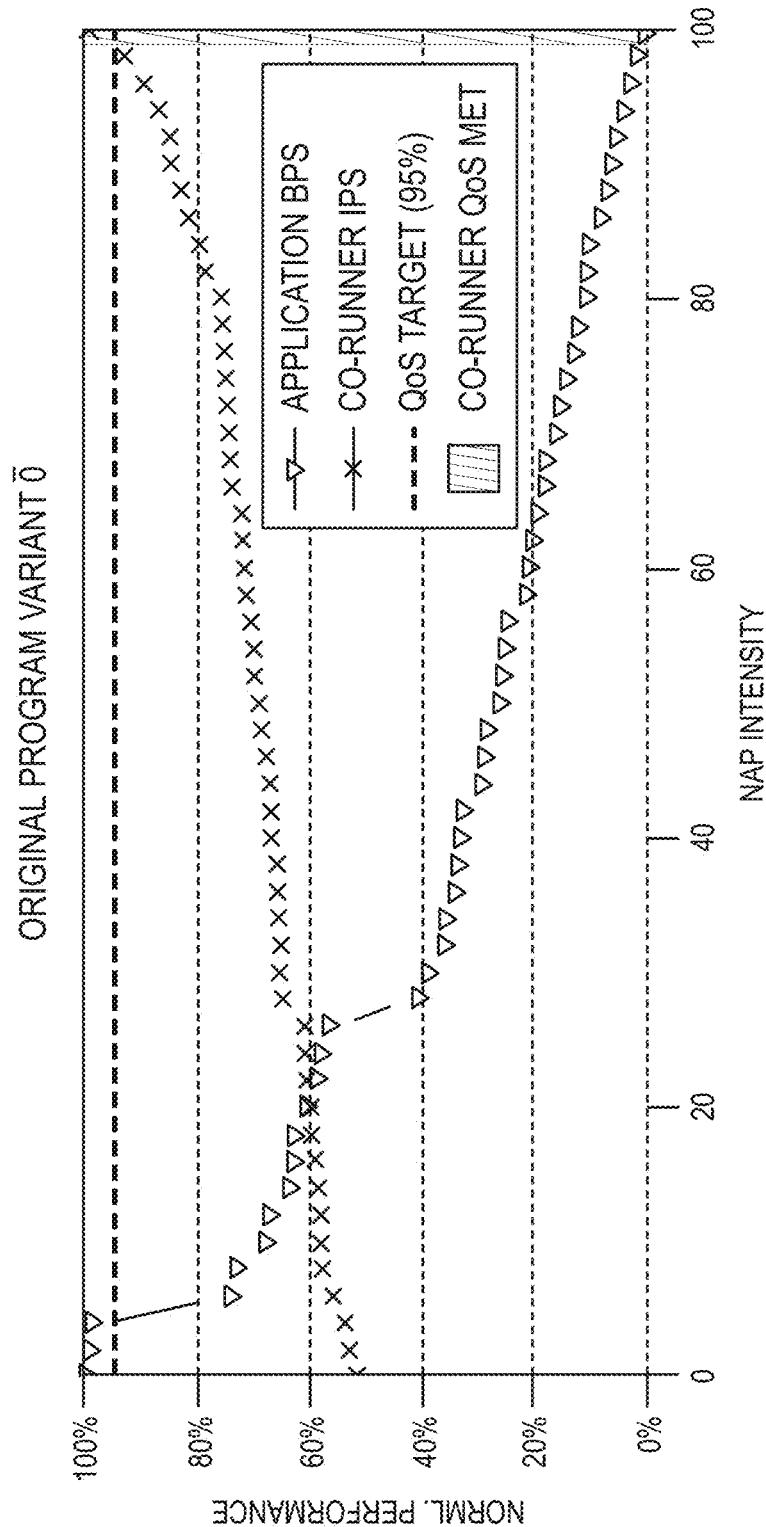
FIGS. 3A and 3B are plots of normalized performance for online evaluation for two variants of a host program (libquantum) running with er-naive (co-runner), showing the host program and variant, without optimization (FIG. 3A) and showing the host program and variant, with optimization (FIG. 3B), in an example.
Figure 3B:
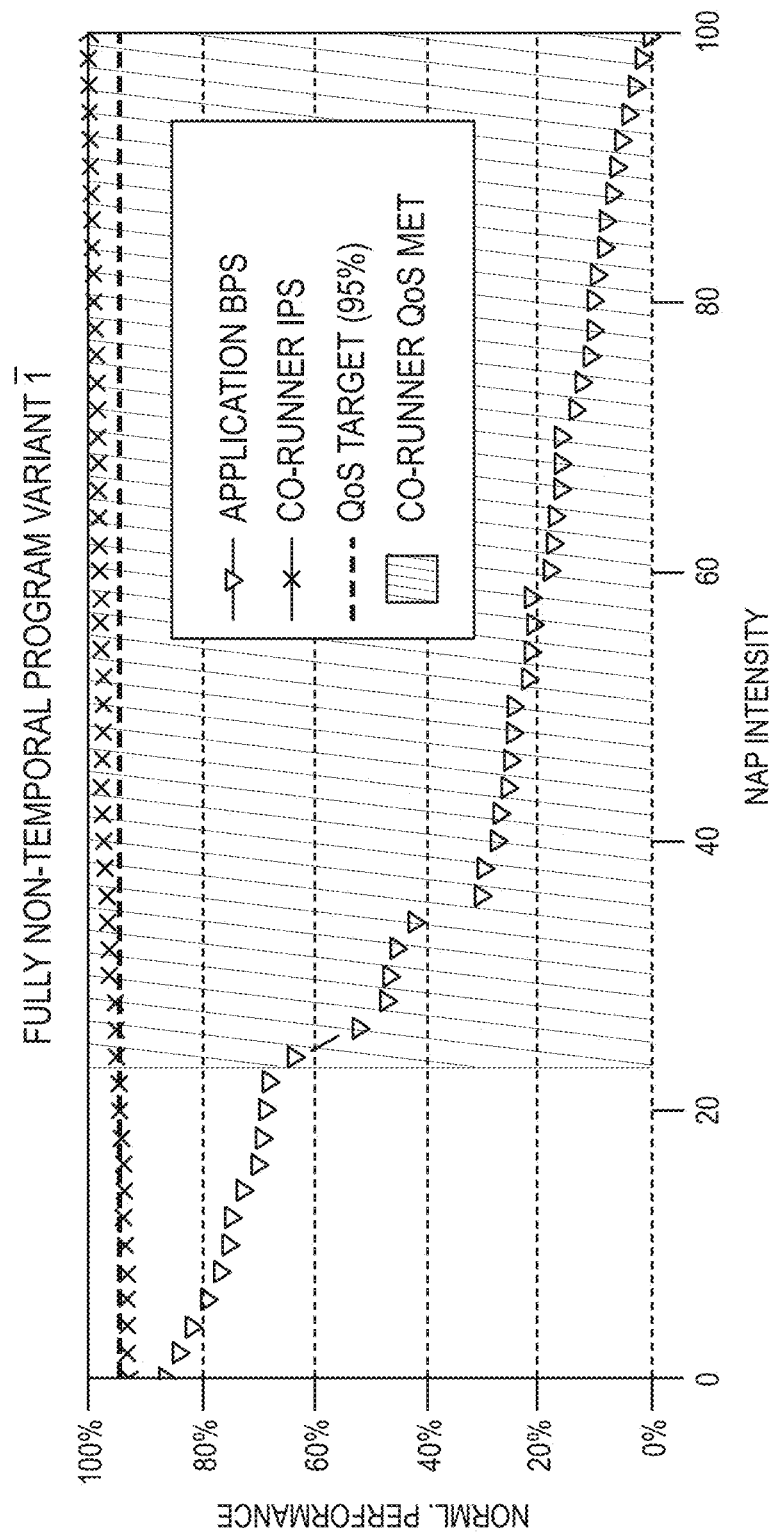

This concept is illustrated in FIGS. 3A and 3B, which presents the performance of two variants of libquantum (i.e., the host application) running with er-naive (external high-priority co-runner) as a function of the nap intensity applied to libquantum. Performance of libquantum is reported in terms of branches per second (BPS) normalized to its BPS while running alone, while performance of er-naive is reported as instructions per second (IPS) normalized to its IPS running alone. We used BPS for host applications, in this example, because, unlike branch counts, their static instruction counts change with the insertion/removal of non-temporal hints. As FIGS. 3A and 3B illustrate, each of these two variants exerts a different level of cache pressure on er-naive, and thus given a hypothetical QoS target of 95% for er-naive, a different level of nap intensity is required to allow er-naive to hit its QoS target. In this example, the libquantum variant in FIG. 3A requires a nap intensity of 99% to allow er-naive to meet its QoS target, while the variant in FIG. 3B requires a nap intensity of just 23%. At those respective nap intensities, the performance of variant FIG. 3B is far better than that of FIG. 3A.

When evaluating a variant dynamically to discover the minimum nap intensity needed to meet co-runner QoS, the datacenter cache manager need not evaluate the entire spectrum of nap intensities. The performance of both the application and its co-runners are monotonic as a function of nap intensity, so the datacenter cache manager was able to organize the variant evaluation as a binary search over the range of nap intensities, shown in Algorithm 2. To reduce the search even further, the datacenter cache manager performed the binary search only within the range of nap intensities between the lower and upper bounds established by evaluating other variants.

Monitoring Co-runner QoS

During runtime, the datacenter cache manager continuously monitored application co-runners to measure their quality of service (QoS). In this example, we used co-runner instructions per second (IPS) relative to the IPS running without the host application as a proxy for QoS. To measure co-runner IPS without the host, the datacenter cache manager used a flux approach, in which the host program is put to sleep for a short period of time (e.g., 40 ms) and performance measurements were taken while the co-runners executed without interference from the host. We deployed one such measurement every 4 seconds, allowing the flux technique to be deployed with very little (1%) overhead.

Example Protean Compiler Module and Protean Runtime Module

In an example, the protean code static compiler and runtime compiler were implemented on top of LLVM version 3.3. When compiling protean code or non-protean code benchmarks, compilation was done with -O2. In the example described below, all experiments were performed on a quad core 2.6 GHz AMD Phenom II X4 server. Applications used throughout the evaluation were drawn from one or more executable benchmark applications: CloudSuite, the SPEC CPU2006 benchmark suite, the PARSEC benchmark suite, and SmashBench.

Performance of Protean Application Code

To evaluate performance in the datacenter chance manager example, the baseline cost of virtualizing execution with protean code was compared with the cost of virtualizing execution with DynamoRIO. DynamoRIO is a state of the art binary translation-based dynamic compiler, chosen as a baseline because it is a mature software project that is actively maintained and is well known for its low overhead relative to other dynamic compilers.

Figure 4:
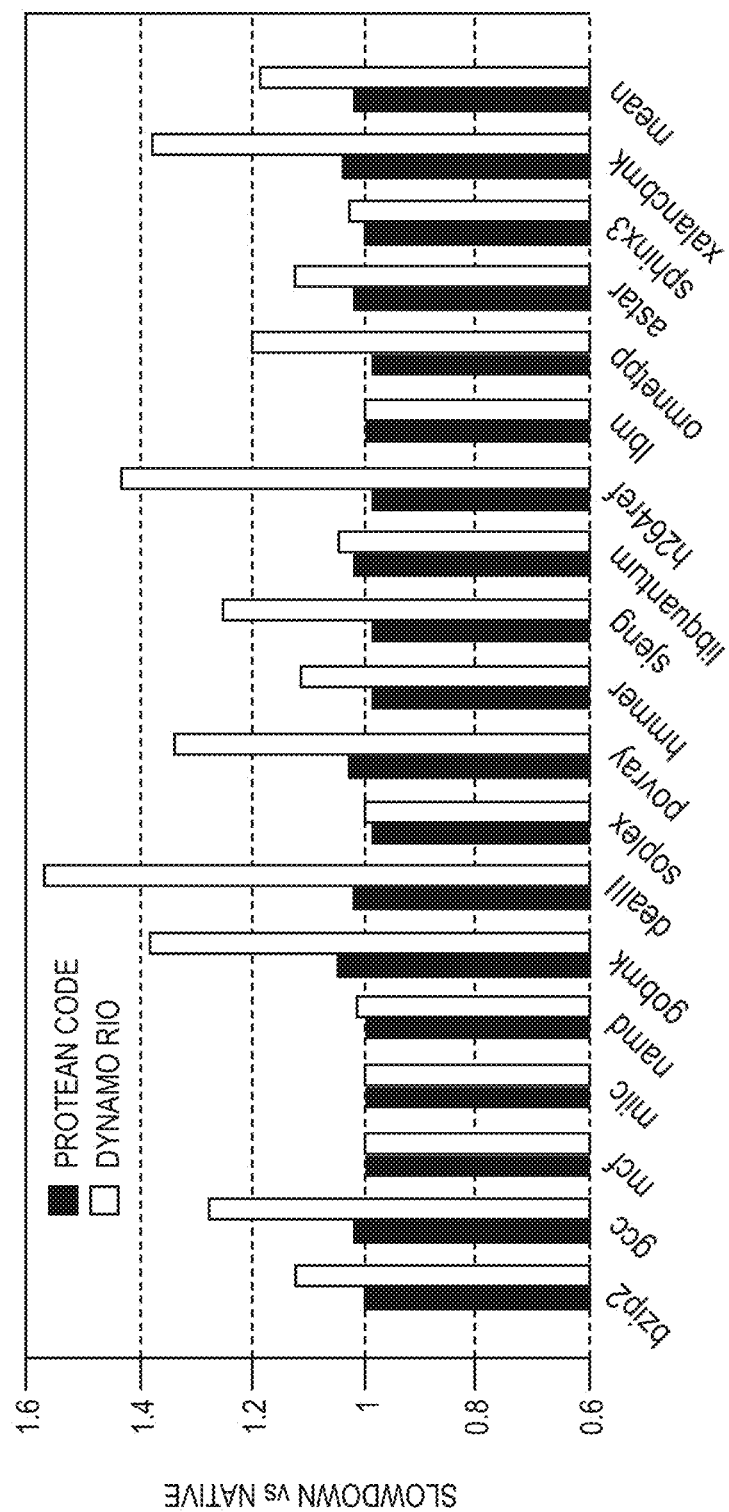
FIG. 4 is a plot showing dynamic compiler overhead when making no code modifications (DynamoRIO) versus using the techniques described herein (protean), in an example.

FIG. 4 shows the overhead for SPEC applications compiled as protean code relative to the non-protean code (DynamoRIO) version of the benchmark. The base performance overhead of protean code mechanism is shown to be negligible, less than 1% on average. DynamoRIO, on the other hand, introduces an average of 18% overhead when performing no code modification.

A distinction between binary translation and the protean code techniques described herein is that protean code performs compilation asynchronously, out of the application's control flow path. Running protean code is low overhead because the application is allowed to continually execute, even when code is being compiled and dispatched. Binary translation incurs higher overhead because it requires all execution to occur from the code cache or interpreter; and thus control is continually diverted from the application back to the binary translation system.

The protean code runtime environment runs in its own process and performs compilation asynchronously with respect to the running host application, employing a dynamic compiler to introduce new code variants into the running host program. The level of impact from this dynamic compiler was shown using a serious of dynamic compilation stress tests.

Figure 5:
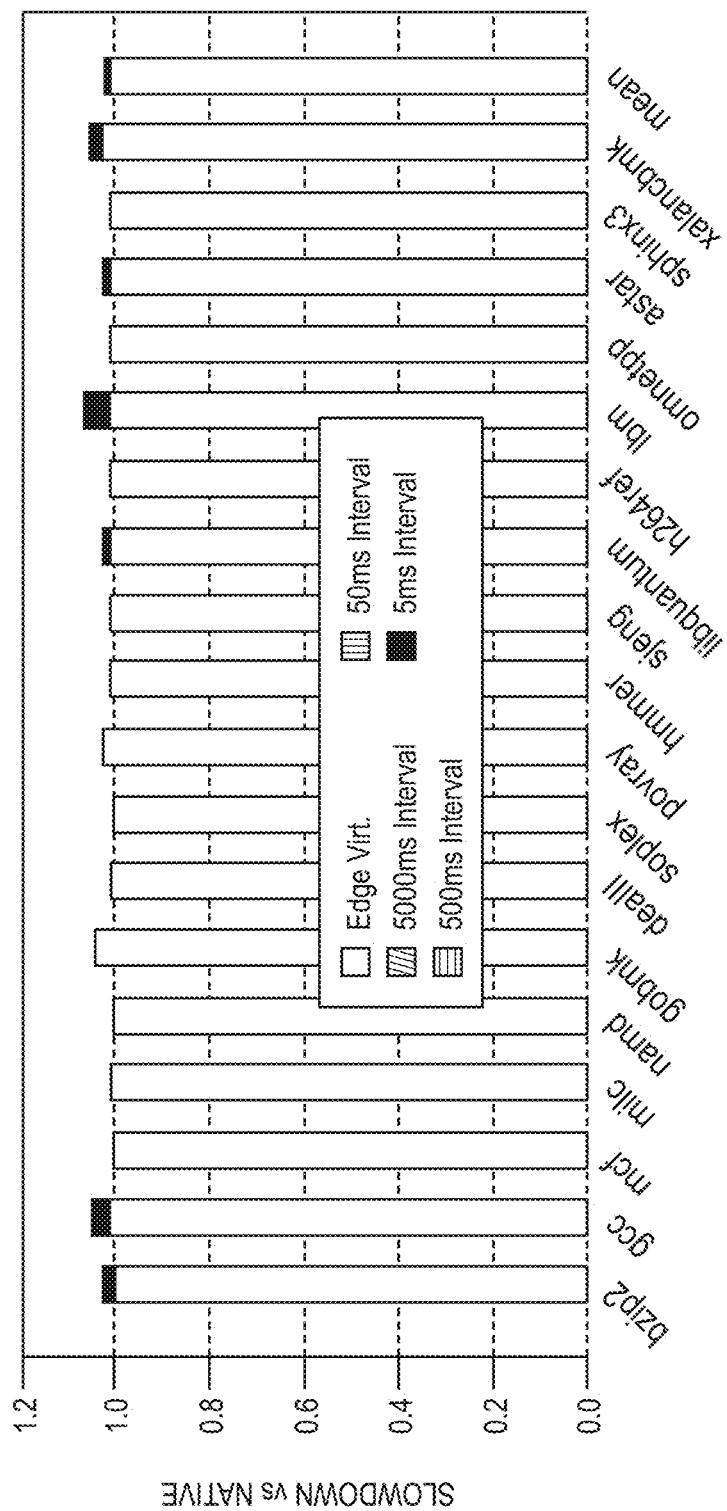
FIG. 5 is a plot of dynamic compilation stress tests, where compilation occurs on a separate core from the host application, in an example.

FIG. 5 shows the results of experiments for the SPEC benchmarks for a range of different time intervals between recompilations, where the runtime process (including the dynamic compiler of the protean runtime environment) uses a dedicated physical core. The results show that the dedicated physical core causes the dynamic compiler to generate very little overhead to the host program, even when performing recompilation every 5 ms. We note that the LLVM compiler backend uses an average of around 5 ms to compile a function, so the 5 ms trigger interval results in the dynamic compiler being active almost continuously, and again with very little overhead.

Figure 6:
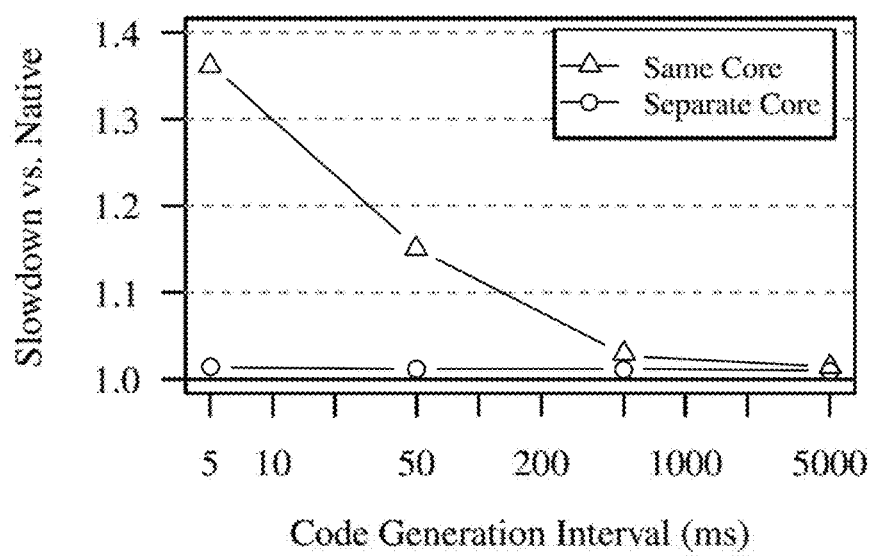
FIG. 6 is a plot dynamic compilation stress tests on separate vs. same core systems, in an example.

FIG. 6 presents, for the SPEC benchmarks, the average performance overhead of performing the same dynamic compilation stress tests, with the runtime on the same core as the host or on a separate core from the host.

While executing the runtime on a separate core introduces minimal overhead no matter how frequently code generation is performed, the overheads of performing the compilation on the same core as the host program can be significant in extreme cases where compilation is nearly continuous. In an era of multicore and manycore processors, and particularly in datacenter environments, the common case is for cores to be heavily underutilized. For example, Google reports typical server utilization levels of 10-50%. Nevertheless, in such instances where no separate core is available for the runtime, this overhead can be controlled by limiting the frequency of recompilation. As shown in FIG. 6, the overhead of recompilation on the same core became negligible at 800 ms.

Figure 7:
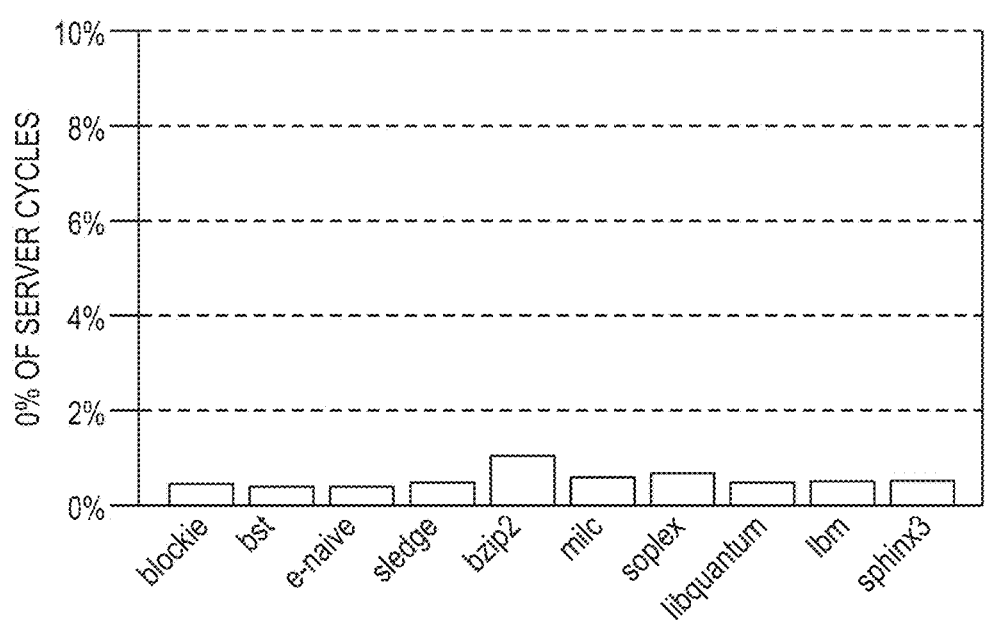
FIG. 7 is an average fraction of server cycles consumed by an example implementation of the techniques during runtime and in a datacenter application, in an example.

Another unique feature of protean code techniques is that the work of dynamic compilation of a host program may be offloaded to use otherwise spare cycles on the host server, putting those cycles to work for the benefit of the running applications. While the demand on the runtime to generate new variants is inevitably a function of the optimization objective, in the datacenter cache manager examples described herein the CPU utilization levels of the dynamic compiler and the entire runtime were quite low. FIG. 7 presents the percentage of the server's cycles used by the datacenter cache manager runtime to manage a variety of batch applications, which is less than 1% in all cases.

Figure 8:
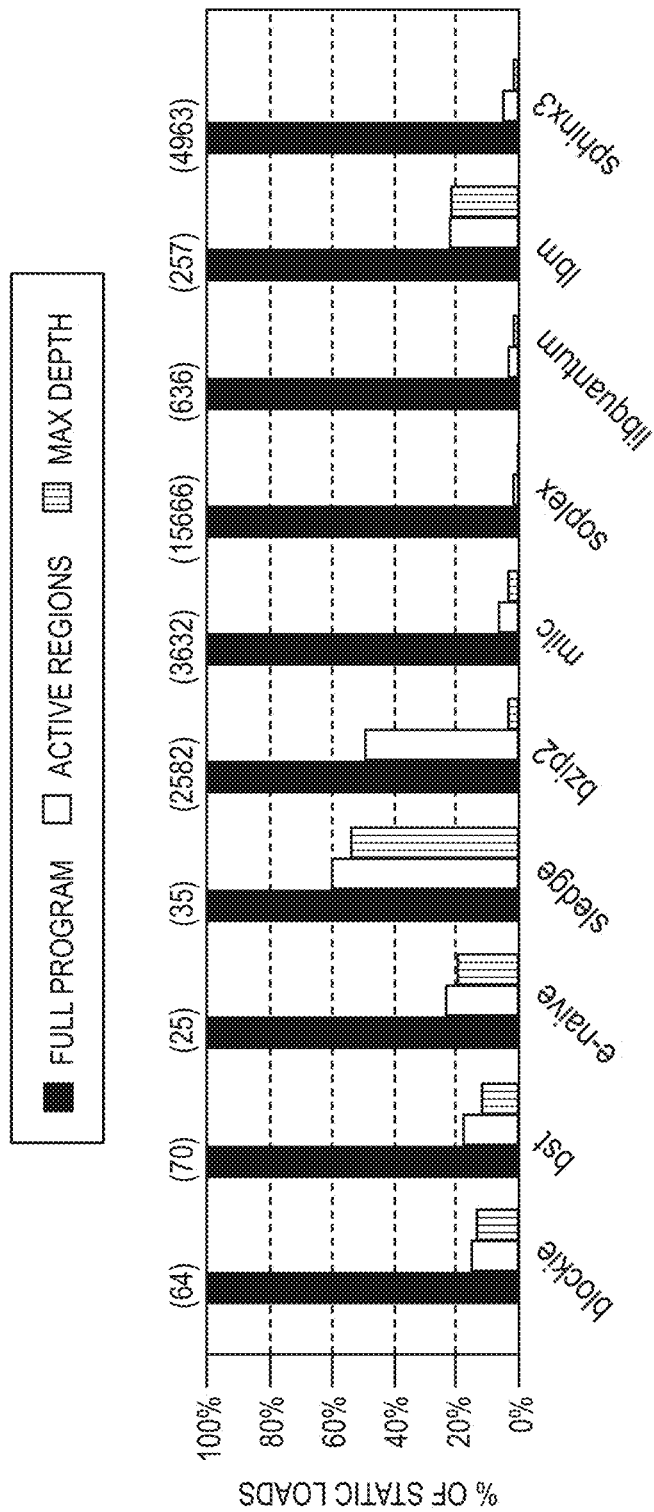
FIG. 8 is plot showing that heuristics significantly reduce the search space for an example implementation of the present techniques.

As noted above, the datacenter cache manager employed several heuristics, described above, to reduce the number of load instructions considered in the search. FIG. 8 illustrates an evaluation of how effective those heuristics were across a set of contentious applications, for a given implementation. Each cluster shows the number of loads that must be considered by the search as each successive heuristic is applied, normalized to the total number of loads in the application. Where there are multiple phases in a program, FIG. 8 presents the average number of loads across all phases. Absolute counts of the number of loads that appear in each program are also included as numbers at the top of the plot. The datacenter cache manager first discarded loads from uncovered code—code regions that appear to the runtime system to have never executed during the current phase. As shown, on average, discarding loads from uncovered code results in a reduction of the search space by a factor of 12x. Second, the datacenter cache manager extracted loop structure from the IR and discarded each load that was not at the maximum loop depth within each function.

Overall, the heuristics were quite effective, reducing the number of static loads examined in the search by an average factor of 44× while covering more than 80% of the dynamic loads, in these examples.

The datacenter cache manager implementation demonstrated a positive impact on server utilization and application QoS, including when running batch applications with latency-sensitive web service applications, including web-search, media-streaming and graph-analytics from the CloudSuite application, available from École Polytechnique Fédérale De Lausanne, Lausanne, Switzerland. We demonstrated average utilization gains of 49%, 67%, and 90% for QoS targets of 98%, 95%, and 90% respectively, for the web-search application. Similar utilization rate gains (averaging 67%, 75%, and 82%, respectively) were achieved for the graph-analytics application. For the more intensive media-streaming, utilization gains of 22%, 40%, and 60% were obtained, respectively. These gains in utilization, which can also be described in terms of gain factors 1/utilization gain %, are provided by way of example, and can vary upwards or downwards depending on the host application, as well as the implementation of the protean techniques herein.

Figure 9A:
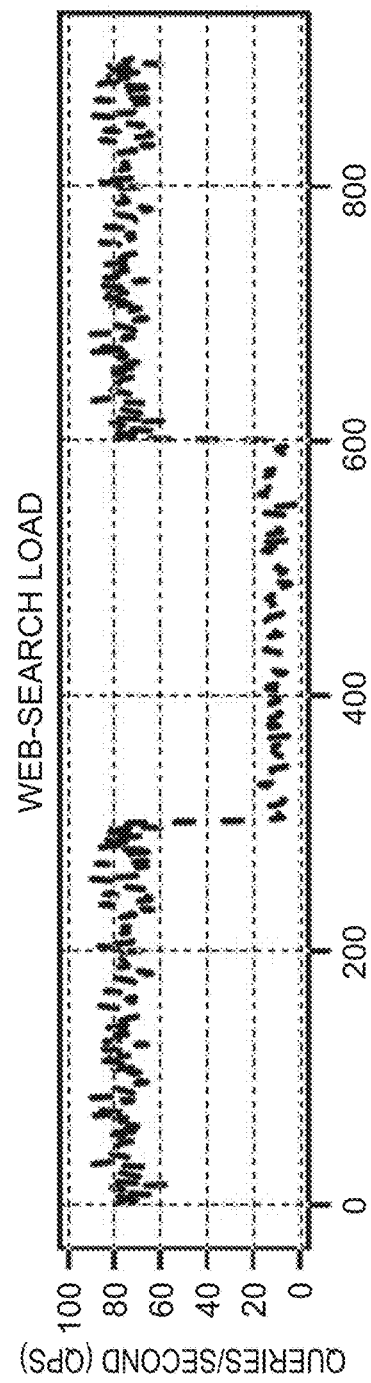
Figure 9B:
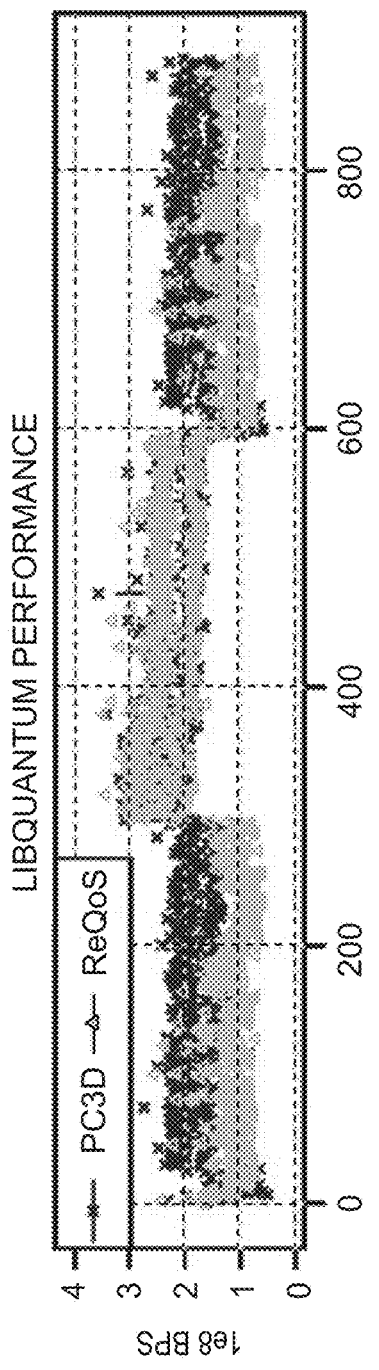
Figure 9C:
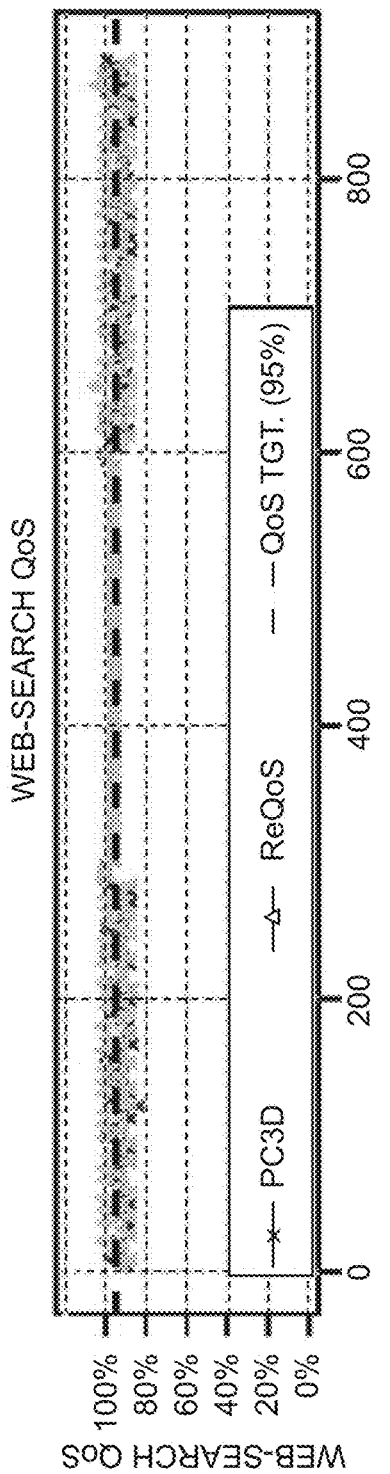
Figure 9C:
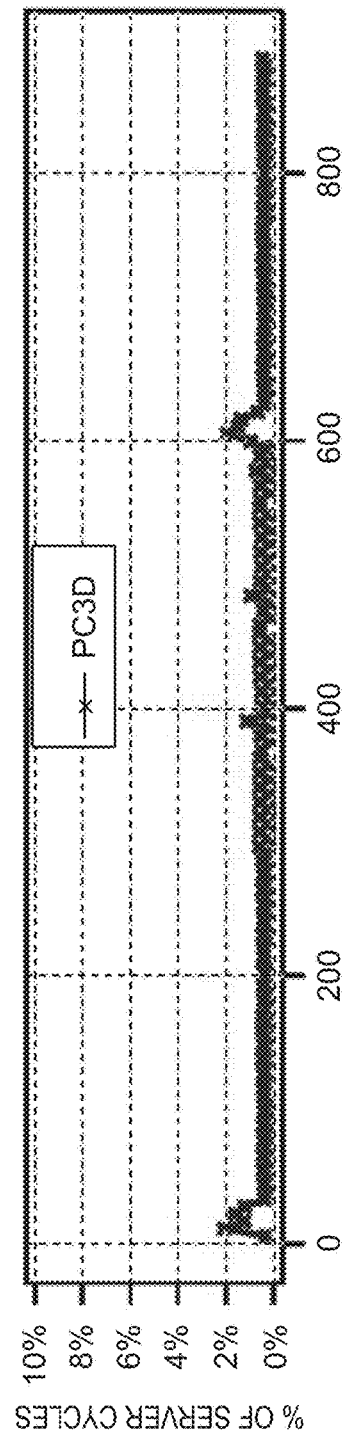

Given that the present techniques can have particular benefits to online accessible services, i.e., web services that are key to datacenter application, FIGS. 9A-9F illustrates a comparison of the host program libquantum running with web-search and using the techniques described herein. The dynamic behavior of the datacenter cache manager implementation versus Re-QoS is shown. FIG. 9A shows the load on the web-search, which shifts over the course of the runtime as different loads access the application online. FIG. 9B shows a trace of the performance (branches per second) of libquantum over the same time frame. FIG. 9C shows the QoS of web-search; and FIG. 9D shows the cycles spent running the PC3D runtime.

libquantum initially (t=0) begins to execute alongside web-search. The protean runtime environment (e.g., the runtime module employing the datacenter cache manager) continuously monitors web-search as an external application, and detects that libquantum jeopardizes web-search QoS. The runtime module begins to search for alternate code variants for libquantum that allow web-search to meet its QoS while allowing libquantum to make better progress. The performance of libquantum during the variant search is shown in greater resolution in FIG. 9E. By t=20, the runtime module has arrived at an improved variant of libquantum, and the runtime module runs with this variant until a co-phase change is detected at t=300.

At t=300, the demand placed on web-search shifts, at which point the runtime module detects a change in the behavior of web-search, causing it to revert libquantum back to its original (no non-temporal hints) variant. Until t=600, the original variant of libquantum runs at full speed because web-search is not sensitive to contention at low load.

At t=600, the load to web-search picks up and the runtime module again searches for an improved variant that reduces cache contention. At t=620, the variant search ends and the improved variant of libquantum runs until the end of the experiment (t=900).

FIG. 9D shows the fraction of server cycles used by the runtime environment. Activity is minimal, kept to well below 1% of the server's cycles for the majority of the run. Two brief mini-spikes of up to 2% appear at t=0 (a higher-resolution view of this spike is presented in 16(f)) and t=600 as the runtime module generates code to search for variants that improve the performance of libquantum.

FIGS. 9B and 9C also show the impact of ReQoS on the same run of libquantum and web-search. ReQoS adjusts the nap intensity, reacting to load changes at t=300 and t=600. During periods of high load ReQoS allows web-search to meet its QoS target strictly by applying naps to libquantum, causing libquantum to make significantly slower progress than it makes when running with the present runtime environment techniques.

We also examine the impact of the present techniques on large-scale datacenter clusters. For example, the number of servers required to house a variety of a web service and batch application is substantially higher than with the present runtime environment techniques described herein. Running with 10 k (10,000) servers, we were able to achieve a level of throughput for each of a series of test applications that required between 3.5 k to 8 k additional servers for these environments that ran no co-location (to serve as a baseline). That is a considerable improvement in the number of servers, costs and resources. Converting that to energy efficiency savings, we saw improvements at the datacenter level of between 18-34%, in energy reduction. Again these numbers, like the other performance data herein, are provided by way of example; but they establish the substantial improvements of the present techniques over conventional systems.

Thus, we demonstrate in this example that the present techniques are quite beneficial for datacenter applications. The techniques provided a runtime approach to mitigating cache contention for live datacenter applications by dynamically inserting and removing software non-temporal cache hints, allowing batch applications to achieve high throughput while meeting latency-sensitive application QoS.

Figure 10:
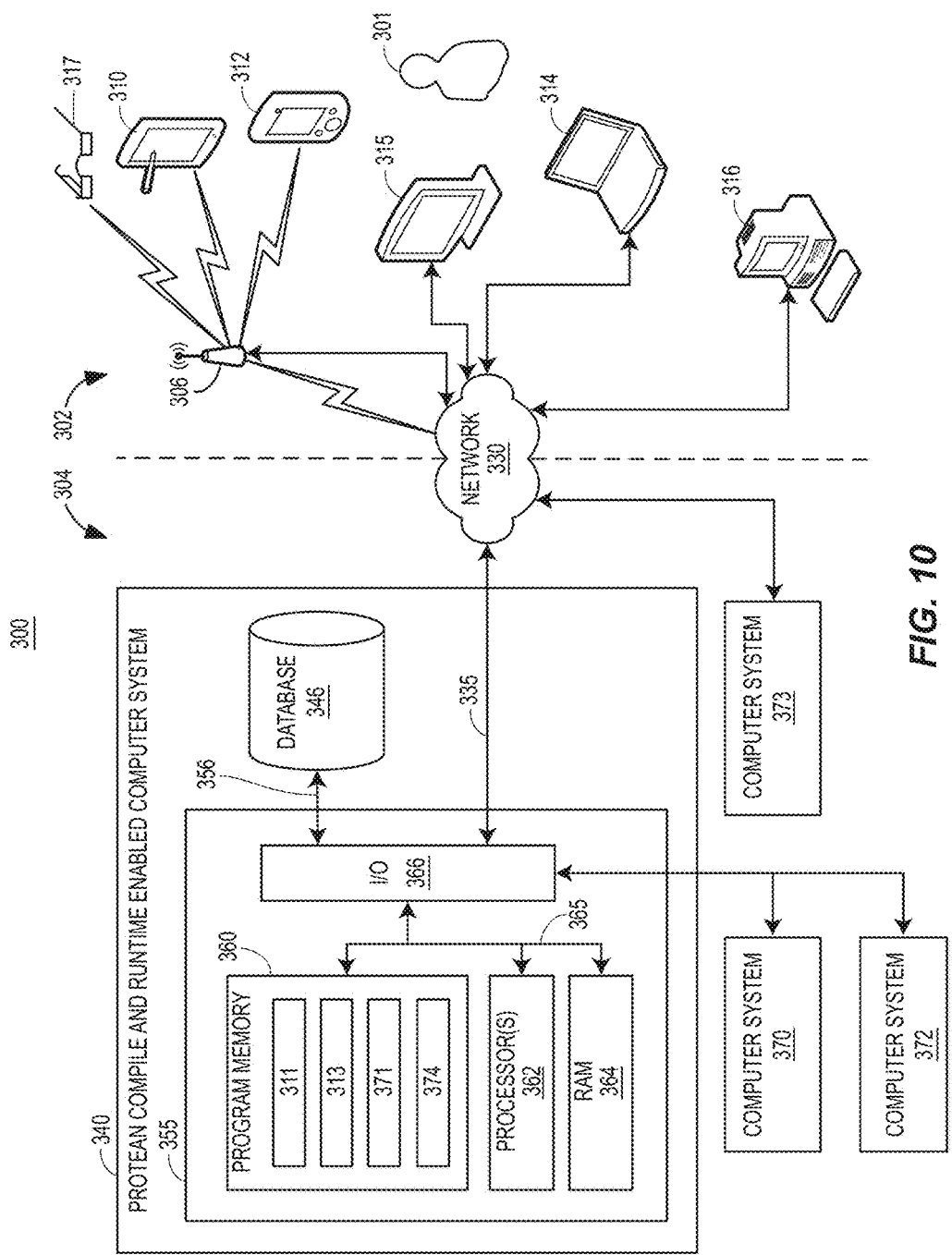
FIG. 10 illustrates a system architecture including one or more computer systems enabled with the compiler and runtime techniques of FIGS. 1A and 1B, in accordance with an example.

FIG. 10 illustrates system architecture 300 for implementing the techniques described herein, including the compiler environment 102 and runtime environment 202 of FIGS. 1A and 1B. The high-level architecture includes both hardware and software applications, as well as various data communications channels for communicating data between the various hardware and software components. The system 300 may be roughly divided into front-end components 302 and back-end components 304. The front-end components 302 are primarily disposed within devices 306-217 that represent devices capable of accessing programs that execute on the back-end components 304. The devices 306-317 may be located, by way of example rather than limitation, in separate geographic locations from each other, including different areas of the same city, different cities, or even different states, and access the programs on the back-end components 304 through a network 330.

The back-end components 304 represent one or more computer systems. For example, the back-end components 304 may represent one or more servers of a datacenter, for which there may be 1,000s or 10,000s of such servers. The back-components 304 illustrate one such computer system or server 340 in detail, with other similar servers illustrated generally as 370, 372, and 373. Each of these servers 340, 370, 372, and 373 are able to communicate through the network 330 or through an I/O interface 366, for example, to exchange data, to allow for co-located processing, to allow for distributed processing, etc. The servers 370, 372, and 373 may be either protean-enabled servers like that of computer system 340 or non-protean enabled.

Each of the devices 306-317 may communicate with one or more of these servers 340, 370, 372, and 373 through the network 330, as well, for example by accessing web-enabled programs executing on the devices 306-317 that communicate with web-enabled programs executing on the servers 340, 370, 372, and 373 via HTTP (hypertext transfer protocol) or any other type of information server capable of transmitting information according to any network communications protocol.

The network enabled devices may include, by way of example, a network-enabled cellular wireless terminal 306, a phone 308, a tablet computer or personal digital assistant (PDA) 310, a smartphone 312, a laptop computer 314, a desktop computer 316, a wearable wireless communication device such as a wearable computer 317, a tablet computer, a portable media player, an e-reader, or other similar devices (not shown), as used by a user 301.

The digital network 330 may be a proprietary network, a secure public Internet, a virtual private network or some other type of network, such as dedicated access lines, plain ordinary telephone lines, satellite links, combinations of these, etc. Where the digital network 330 comprises the Internet, data communication may take place over the digital network 330 via an Internet communication protocol. The digital network 330 may communicate with the devices 306-317 through wireless or wired connections, including through a network device such as a router or base station 318. Further, in some examples, the digital network 330 is a mobile (or cellular) communication network.

The computer system 340 executes a compiler environment in which program code is compiled in accordance with examples herein and a runtime environment in which compiled code is executed as a runtime application, in a dynamic way as a described herein. At least some runtime applications may be web-enabled applications accessible to the devices 306-317, for example in server environments.

The computer system 340 may include one or more computer processors 362 adapted and configured to execute various software applications and components of the compile environment 102 and runtime environment 202, in addition to other software applications.

The computer system 340 may further include a database 346 adapted to store data related to the operation of the environments 102 and 202. The computer system 340 may access and store data in the database 346 when executing various functions and tasks associated with executing the techniques herein.

The computer system 340, as an application server, may have a controller 355 operatively connected to the database 346 via a link 356 connected to the input/output (I/O) circuit 366. It should be noted that, while not shown, additional databases may be linked to the controller 355 or configured within the database 346. The controller 355 includes a program memory 360, the processor 362 (may be called a microcontroller or a microprocessor), a random-access memory (RAM) 364, and the input/output (I/O) circuit 366, all of which are interconnected via an address/data bus 365. It should be appreciated that although only one microprocessor 362 is shown, the controller 355 may include multiple microprocessors 362. Similarly, the memory of the controller 355 may include multiple RAMs 364 and multiple program memories 360. Although the I/O circuit 366 is shown as a single block, it should be appreciated that the I/O circuit 366 may include a number of different types of I/O circuits. The RAM(s) 364 and the program memories 360 may be implemented as semiconductor memories, magnetically readable memories, and/or optically readable memories, for example. A link 335 may operatively connect the controller 355 to the digital network 330 through the I/O circuit 366.

The program memory 360 may include a user-interface application 311 for allowing a user to input and view data associated with the system 300, and to interact with the system 300. The user interface application 311 may be a web browser client for example. The computer system 340 may implement a server application 313 for providing data to the user interface application 311.

However, the user interface application 311 may be any type of interface, including a proprietary interface, and may communicate with the application server 140 using any type of protocol including, but not limited to, file transfer protocol (FTP), telnet, hypertext-transfer protocol (HTTP), etc. Moreover, some embodiments may include the user interface application 311 running on one of the network-enabled devices 206-217 (as when a customer is accessing the system).

The computer system 340 stores, within the program memory 160, programs for executing the techniques herein. For example, the program memory 160 stores a compiler module 371 and a runtime module 374, which are like those of the compiler module 103 and the runtime module 204, in FIGS. 1A and 1B respectively. The compiler module 371 may generate a protean application (e.g., the protean application 106) and store that application in the program memory 360 or in the RAM 364 for execution on the system 340. The runtime module 374 may generate co-located code variants and store them in a code cache (e.g., the code cache 208) that may be in the program memory 360 or in the RAM 364. The runtime module 374 may monitor data, introspectively and extrospectively, collected from the host system 340 alone and/or from any of the servers 370, 372, and 373, monitored by the module 374.

Each of the servers 370, 372, and 373 may have a similar configuration to that of the protean system 340.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A computer-implemented method of compiling a host application code for runtime execution on one or more runtime processors, the method comprising:
   receiving a host application code;
   virtualizing, at compile time by a static compiler, in one or more processors, one or more control edges in the host application code, the host application code comprising a plurality of cached executable functions and/or code regions, where the one or more control edges are redirection points for a subset of the plurality of executable functions and/or code regions, the redirection points being configured for (i) redirecting a second, runtime compiler out of the host application code during the runtime execution and into a co-located executable function and/or code regions for execution in place of the corresponding function of the subset of the plurality of cached executable functions and/or code regions, and (ii) redirecting code execution back into the host application code after completion of the executed cached code;

embedding, in the one or more processors, metadata into the host application code, wherein the metadata includes at least one of (i) a mapping of the subset of the plurality of executable functions and/or code regions to the one or more control edges or (ii) an intermediate representation of the host application code that encodes source level information and program analysis information; and forming, in the one or more processors, a runtime version of the host application code to include the plurality of executable functions and/or code regions and the metadata.

2. The method of claim 1, wherein the intermediate representation is embedded into the host application code at a binary level.

3. The method of claim 1, wherein the metadata includes an edge virtualization table that maps the subset of the plurality of executable functions and/or code regions to the one or more control edges, wherein the edge virtualization table comprises source and target addresses for each of the one or more virtualized control edges.

4. The method of claim 1, further comprising virtualizing the one or more control edges by establishing control edges at code branches and/or code calls within the host application code.

5. The method of claim 1, further comprising virtualizing the one or more control edges by establishing control edges at functional calls within the host application code.

6. The method of claim 5, further comprising virtualizing the one or more control edges by establishing control edges at functional calls where each functional call comprises a callee function, the callee function having more than one basic block.

7. A system comprising:
one or more processors and one or more memories, the one or more memories storing instructions that when executed by the one or more processors, cause the one or more processors to:
receive a host application code;
virtualize, at compile time by a static compiler, in one or more processors, one or more control edges in the host application code, the host application code comprising a plurality of executable functions and/or code regions, where the one or more control edges are redirection points for a subset of the plurality of cached executable functions and/or code regions, the redirection points being configured for ffi redirecting a second, runtime compiler out of the host application code during the runtime execution and into a co-located executable function and/or code regions for execution in place of the corresponding function of the subset of the plurality of cached executable functions and/or code regions, and (ii) redirecting code execution back into the host application code after completion of the executed cached code;

embed, in the one or more processors, metadata into the host application code, wherein the metadata includes at least one of (i) a mapping of the subset of the plurality of executable functions and/or code regions to the one or more control edges or (ii) an intermediate representation of the host application code that encodes source level information and program analysis information; and form, in the one or more processors, a runtime version of the host application code to include the plurality of executable functions and/or code regions and the metadata.

8. The system of claim 7, wherein the metadata includes an edge virtualization table that maps the subset of the plurality of executable functions and/or code regions to the one or more control edges, wherein the edge virtualization table comprises source and target addresses for each of the one or more virtualized control edges.

9. The system of claim 7, wherein the one or more memories further store instructions that when executed by the one or more processors, cause the one or more processors to virtualize the one or more control edges by establishing control edges at code branches and/or code calls within the host application code.

10. The system of claim 7, wherein the one or more memories further store instructions that when executed by the one or more processors, cause the one or more processors to virtualize the one or more control edges by establishing control edges at functional calls within the host application code.

11. The system of claim 7, wherein the one or more memories further store instructions that when executed by the one or more processors, cause the one or more processors to virtualize the one or more control edges by establishing control edges at functional calls where each functional call comprises a callee function, the callee function having more than one basic block.

* * * * *